United States Patent [19]

Clay

[11] 3,991,817
[45] Nov. 16, 1976

[54] GEOTHERMAL ENERGY RECOVERY

[76] Inventor: Rufus G. Clay, 5500 Byers, Fort Worth, Tex. 76107

[22] Filed: July 2, 1974

[21] Appl. No.: 485,319

[52] U.S. Cl. .................................. 165/1; 60/641; 165/45; 175/15; 175/16; 175/108
[51] Int. Cl.² ....................... F24J 3/02; E21C 21/00
[58] Field of Search ................. 175/108, 16, 11, 15, 175/54; 166/177, 61, 62; 60/641; 165/45, 1

[56] References Cited
UNITED STATES PATENTS

| | | | |
|---|---|---|---|
| 3,357,505 | 12/1967 | Armstrong et al. | 175/16 |
| 3,396,806 | 8/1968 | Benson | 175/16 X |
| 3,693,731 | 9/1972 | Armstrong et al. | 175/16 |
| 3,786,858 | 1/1974 | Potter et al. | 165/45 X |
| 3,864,917 | 2/1975 | Jacoby | 60/641 |

*Primary Examiner*—Albert W. Davis, Jr.
*Assistant Examiner*—Sheldon Richter
*Attorney, Agent, or Firm*—Cushman, Darby & Cushman

[57] ABSTRACT

Apparatus and method for recovering resources from subterranean rock formations, particularly heat energy, and more particularly geothermal energy. A heat-drill, which has means associated therewith for removing some rock from the earth and forming other rock into shafts, drills into the earth and forms two shafts at the same time. Both shafts communicate with each other and with the surface and are used to circulate a drilling mud which passes through the drill body and carries off the rock being removed. The heating means is shaped in a coil or grid pattern and operates at a temperature well above the melting point of the rock, heating the rock it displaces to well above its melting point, while raising the average temperature of the total rock melted to slightly above its melting point. The drilling mud absorbs heat as it circulates and the absorbed heat is put to any desirable use, particularly by being recovered from the drilling mud by a heat-exchanger on the surface. The drill has means associated therewith for automatically controlling its rate of advance into the earth and its general downward direction. The drill has means associated therewith for preparing the shafts, particularly the downflow shaft, for a particular type of fracturing of the surrounding rock formations to facilitate the collection of heat therefrom. Later heat recovery is facilitated by forming convection cells within the factures which encourage circulation of fluids at a distance from the shafts.

52 Claims, 8 Drawing Figures

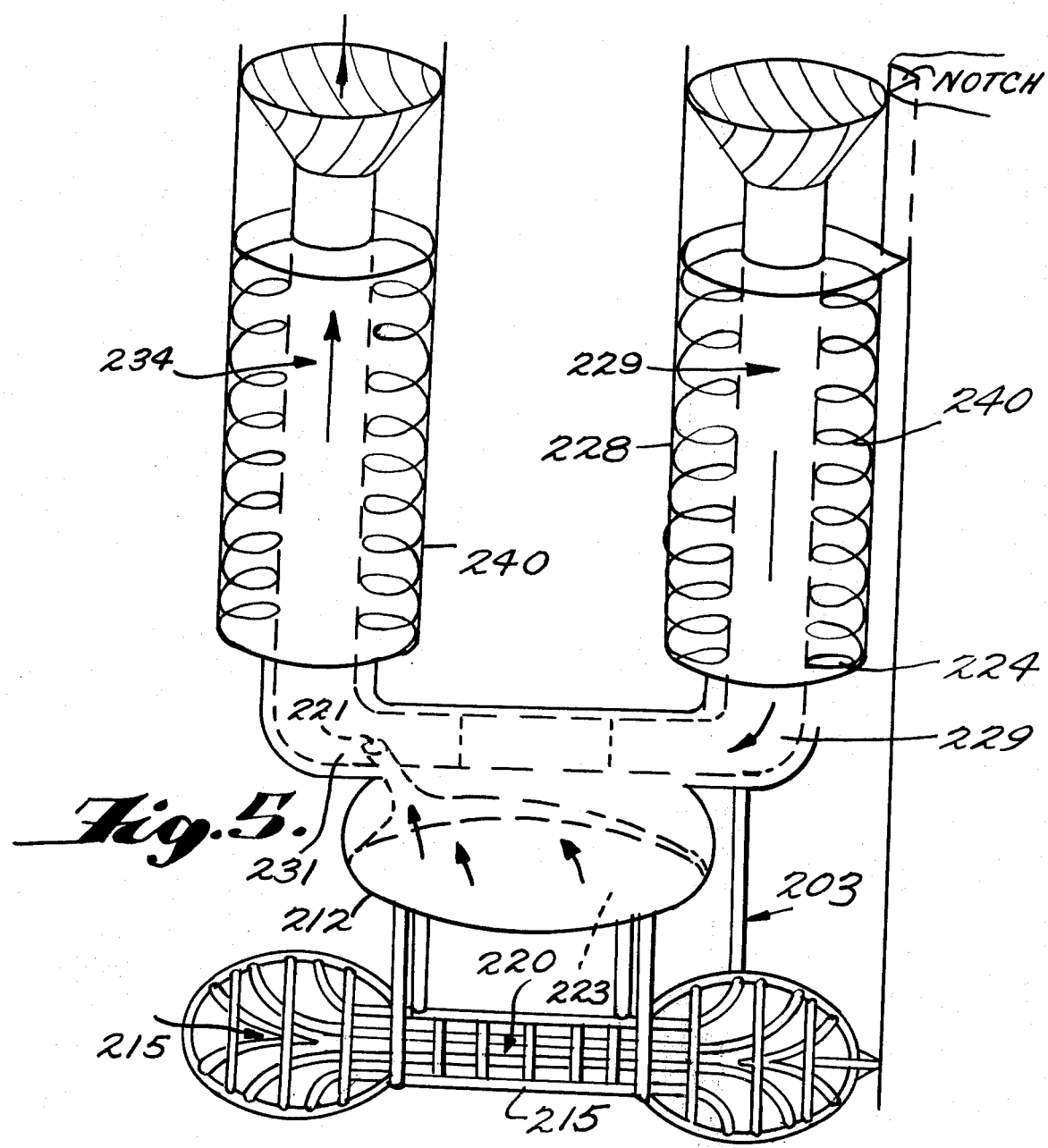
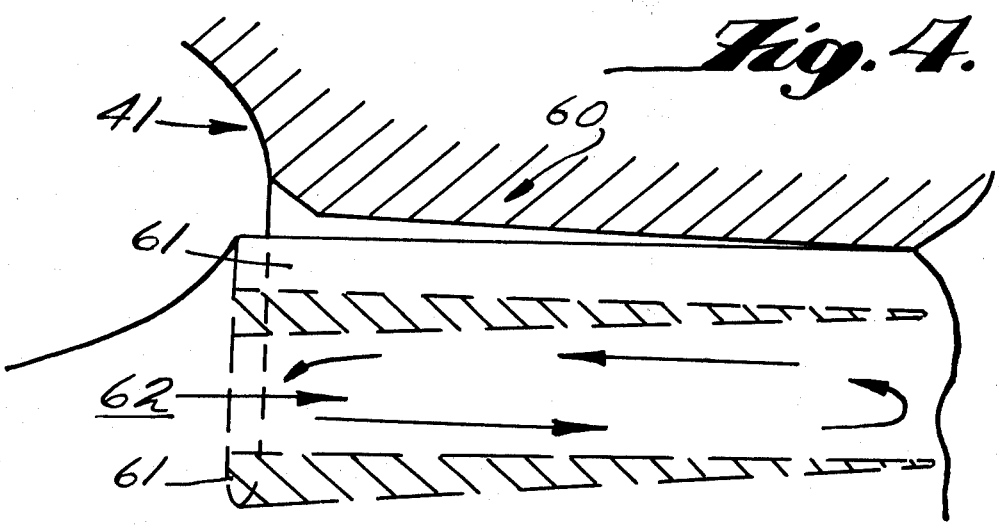

GEOTHERMAL ENERGY RECOVERY

BACKGROUND AND SUMMARY OF THE INVENTION

The invention relates to a method and apparatus for recovering resources from below the earth's surface, particularly heat, and particularly geothermal energy resources. It is generally recognized by geologists that within a distance of 20 miles beneath any point of the earth's surface, including the ocean floors, temperatures reach levels that would usefully power heat engines. The only previous barrier to the recovery of such energy resources was the difficulty of providing adequate heat-exchanging means at depths with substantial geothermal resources. Once that barrier is overcome at a certain point of the earth's surface that point becomes a suitable site for geothermal energy recovery operations. Geologists believe that the easily available geothermal resources which have been successfully recovered in the past existed close to the earth's surface as the result of natural heat-exchanging mechanisms at greater depths. These natural heat-exchanging formations make available only a minute fraction of the potential resources lying within 20 miles of the surface. The earth's total geothermal resources greatly exceed the world's energy needs, not only for today but for the foreseeable future. These resources have been almost totally inaccessible to past methods and apparatus, not because the drilling apparatus had not reached a high state of development, but because of the inherent limitations, both technological and economic, of the past drilling methods. The present invention overcomes all of the limitations inherent in the prior methods. It is the purpose of the present invention to make the geothermal resources of the earth generally accessible to meet the world's great need for energy, particularly for nonpolluting energy, which is an essential requirement of life and prosperity.

In the past it has been proposed to drill two separate holes into a solid rock formation with heat-drills or other drills, fracture the rock hydraulically or by nuclear explosions to create connecting passages for fluid flow, and then circulate fluid down one hole, through the connecting passages and up the other hole to recover heat. In the case of nuclear explosions part of the heat generated by the nuclear reaction would also be recoverable. It has also been proposed to drill one hole, remove the drill, and insert pipes into the hole through which a fluid would circulate to remove heat (see U.S. Pat. Nos. 3,274,769; 3,470,943; and 3,521,699). Various types of apparatus have been proposed for doing the drilling, such as the heat-drills disclosed in U.S. Pat. Nos. 3,396,806; 3,357,505, and 3,693,731. While prior methods and apparatus are in general satisfactory, they generally have one or more of the following drawbacks: requiring separate drilling operations for each hole; requiring drilling pipe of a length on the order of the depth of the hole to circulate drilling mud to remove excess rock; requiring considerable mechanical force to be applied to the drill as an essential part of the drilling operation; causing considerable abrasion of the drill which tends to wear down the radial dimension of the drill and reduce the cross-sectional dimensions of the hole; requiring repeated casings to be positioned each extending from the surface to the vicinity of the hole bottom at the time to prevent collapse of the shaft walls; requiring each casing to fit inside the smallest part of the hole it can reach in a hole of decreasing diameter; requiring each casing to fit inside the ones already in place and hence be of successively smaller diameter; requiring repeated recovery and replacement of the worn drills; requiring each drill used to be able to fit in the smallest part of the shaft at the bottom and hence be smaller than the last; requiring each successive drill to fit in the casings in place and hence be smaller for each new casing; not usefully recovering any of the energy expended in the drilling operation; not usefully recovering the energy resources drilled for until after the completion of the drilling process; needing separate operations in addition to drilling to be performed to perforate the casings before circulation of fluids between the shaft and the surrounding formations begins; requiring separate operations in addition to drilling to be performed to the casings to prepare for fracturing operations on the surrounding rock; having no suitable means in heat-drilling operations of controlling the position or orientation of fractures which may be desirable and avoiding fractures which may be undesirable; having no suitable means of connecting two separate holes in solid rock other than fracturing the rock to form connecting passages from hole to hole; having no suitable means to extend a producing two-hole geothermal well to a greater depth without sealing the connecting passages between the holes; requiring heat-drills to apply their thrusting force to their heating surfaces to move molten rock and the drill; requiring heat-drills to apply such force to their heating surfaces that employable temperatures are limited by the structural strength of the materials rather than by the materials' stability at higher temperatures. The method and apparatus of the present invention overcomes all of the above mentioned drawbacks.

According to the teachings of the present invention, a drill body having a particular shape with a heating element of a particular configuration attached thereto is used to drill into the earth and from two shafts at the same time in the earth. The two shafts are in fluid communication through the body of the drill and are used to circulate a "drilling mud" through the drill body to carry off excess rock. The heating element operates at a temperature well above the melting point of the rock, melts through rock ahead of the drill body, and raises the rock through which it passes to well above the rock's melting point, raising the average temperature of the rock through which the drill body passes, however, to a selected lower degree above the rock's melting point. The heating element passes through a plurality of rock portions spaced throughout the region to be melted, and sweeps through only a fraction of the spatial volume swept out by the drill body. The molten rock takes one of two alternate paths: it either flows into the interior of the drill body and thence into the drilling mud circulating through the drill body and thence to the surface; or it flows around the exterior of the drill body to the top of the drill body, which makes two shafts in the molten rock. Means are provided for making the shafts the desired shape, for the gradual cooling of the shaft walls, and for the maintenance of the molten rock in the desired shape until the rock solidifies leaving two permanent shafts. Means are also provided for causing the shafts formed to spiral around one another in a controlled manner.

The walls of the downflow shaft are formed with one or more grooves extending throughout the length of the shaft, shaped like a V cut into the wall. The grooves are made to facilitate later fracturing of the surrounding rock, and a concentration of thermal stress at the apex of the V cut also facilitates later fracturing and may even cause initial fractures to form at the apex by thermal stress. The drilling mud circulating through the drill body and the shafts absorbs heat in its passage and that heat may be utilized while drilling is taking place; in particular a well-known effect due to absorbed heat is the "thermosyphonic effect" which creates a driving force acting on the fluid in its direction of motion and which may in some cases be the only pumping force needed to circulate the fluid. A heat exchanger at the surface removes heat from the drilling mud for any desired use, particularly to help provide energy to the drilling operation.

Once the drill has reached the desired depth, fractures extending into the surrounding rock are introduced through the grooves hydaulically, propped open by well-known means, and partitioned by material forced horizontally into the fractures at selected depths to form heat-collecting cells. If the shafts spiral around one another the fracture surfaces radiating from the downflow shaft will spiral in the same direction and rate as the shafts, and will resemble helical surfaces. The drilling mud, or a fluid which replaces the drilling mud, will collect heat from the surrounding rock as the fluid circulates through the shafts, the fracture cells, and the drill body. As the drilling progresses the "thermosyphonic effect" provides a pumping action to the circulating fluid which will increase to the point that a turbine may need to be placed in the flow stream to limit the rate of flow. The turbine may be placed in either the downflow shaft or the upflow stream, but the downflow does not contain the rock being removed and may be preferred. The turbine may also be used to provide power. The drill may be re-started at a later date to proceed to a lower level without any need to seal off the fractures. Fractures extending from one shaft do not form part of connecting passages to the other shaft, so all fluid circulating from one shaft to the other passes through the drill body.

It is the principal object of this invention to recover geothermal heat from the earth in a manner which may be more widely applied to a greater variety of geological formations than current methods. It is a further object of this invention to provide a method of drilling which can drill to greater depths than drills in the past. It is a further object of this invention to provide mans to study regions within the earth including those under ice, which have been known only by theory before, and whose resources are thus largely a matter of speculation. It may for example be possible that the oil and gas resources currently found near the surface trapped in sedimentary rock formations are deposits of chemicals migrating through the basement rock from greater depths, and fluids circulating through fractures in the solid rock at sufficient depth may absorb useful amounts of such petrochemicals; thus exploration of unknown regions for unknown resources is a further object of this invention. These and other objects of the present invention will become clear upon an inspection of the detailed description of the invention and from the appended claims.

BRIEF DESCRIPTION OF THE DRAWINGS

FIG. 4 is a diagrammatic view showing fractures formed in the outside walls of the shaft according to the teachings of the present invention;

FIG. 5 is a perspective diagrammatic view of another form of the apparatus according to the teachings of the present invention;

DETAILED DESCRIPTION OF THE INVENTION

Figure 1:
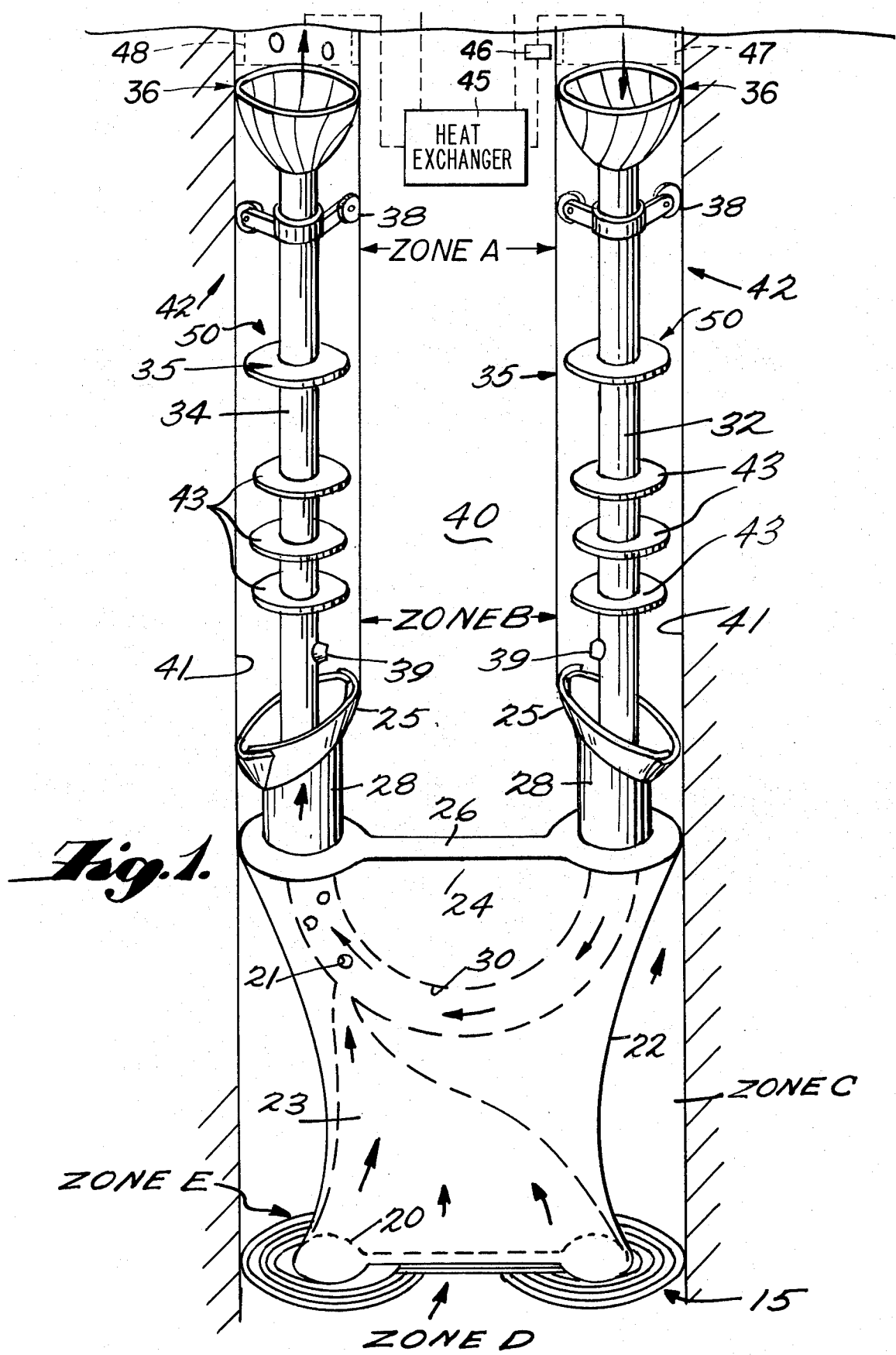
FIG. 1 is a perspective diagrammatic view of the preferred embodiment of the apparatus for drilling solid rock according to the teachings of the present invention.

Apparatus for drilling into rock formations and facilitating recovery of geothermal energy therefrom is shown generally at 10 in FIG. 1. The drilling means comprises a body portion 12 and a heating element 15. The element 15 is preferably made of a refractory material, for example pyrolytic graphite or tungsten, and is made of a number of straight or curved rod-like sections, heated by passing an electric current therethrough, spaced in a grid or coil pattern such as 18, connected to the drill body at points 17 (see FIG. 2), and able to spring somewhat back and forth in the direction of motion of the drill. This element may be enclosed in a casing. The drill body is preferably made of a refractory material, including electrical insulation such as boron nitride. A wider selection of materials may be used for the drill body inclding ceramics and even brick. The drill body has an orifice 20 on its undersurface, shaped side surfaces 22, a lip portion 24, flexible flanges 25, a top surface 26 and shaping portions 28. The shaping portions form shafts having a cross-sectional area approximately equal to the cross-sectional area of the orifice 20. The orifice communicates with a curved pipe section 30 within the drill body 12 via a channel 23 anad an aperture 21.

The heating element 15 melts through the rock in advance of the main drill body 12, and is operated at a temperature well above the melting point of the surrounding rock. One of the rocks which the present invention particularly is intended to drill is granite. Granite has a melting point of approximately 1200° C. The heating element must be capable of being heated to well above 1200° C without melting or deteriorating even after prolonged use. A preferred operating temperature would have the heating element at about twice the absolute temperature of the rock's melting point, or about 2700° C in the case of granite. The heating element 15, in the shape of a grid or coil, melts through the rock in a grid or coil pattern, and passes through only a fraction of the total volume of rock being melted: thus it displaces the rock, as it passes, only a distance on the order of the diameter of the rod-like shape of the individual coils 18 of the heating element 15, and in passing melts only slightly more than the volume of rock it displaces. The remaining solid rock passes through the openings in the coils or grid and is melted by conduction from the hotter rock before the drill body 12 reaches it. This method and apparatus combine three important features which allow the heating element to penetrate the rock with lower resistance than earlier approaches. First, molten rock must be displaced from the surface of the heating element to expose other rock to heat; as long as the molten rock lies between the heating element and the rock which needs to be melted, it acts as an insulator; in the present invention the rock needs only to be displaced on the order of the small diameter of the rod-like element, rather than on the order of the diameter of the drill body as in earlier devices. Second, the rock being displaced by the heating element is much hotter than the average rock melted, and hence has lower viscous resistance. Third, viscous resistance acts on the heating element only the comparatively short time needed to displace the rock. These features allow the heating element to operate at higher temperatures than devices in the past, and hence drill much more rapidly, since the heating element encounters comparatively little resistance, and hence little stress. The total volume of rock melted is, however, raised only to a desired point above its melting point. This represents an economic advantage, combining rapid penetration of the rock with low overall melting temperatures. A coil or grid shaped element 15 obviously would have the same advantages in drilling a single shaft instead of a double shaft.

Figure 6:
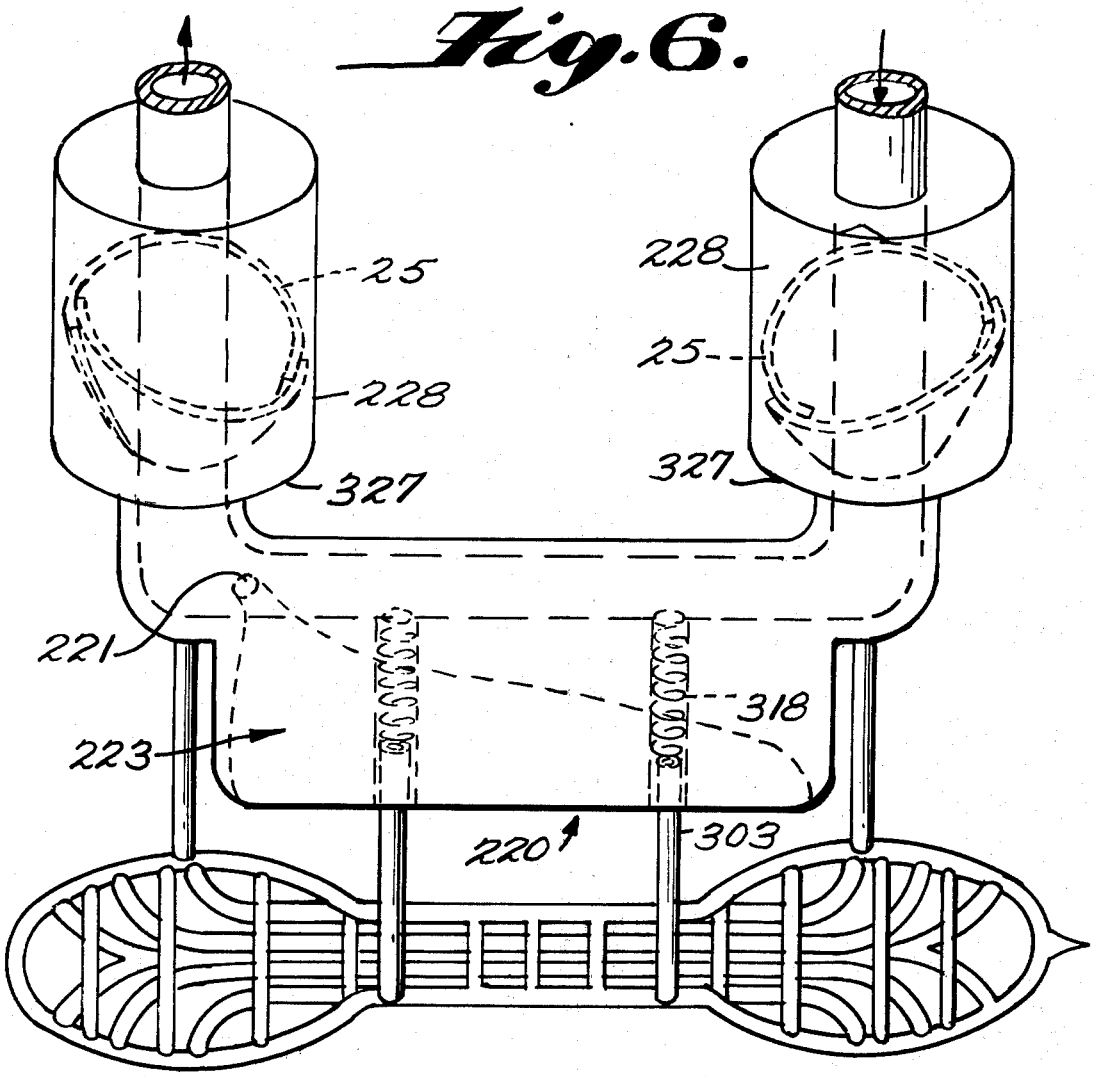
FIG. 6 is a partial view of a modified form of the apparatus shown in FIG. 5.

The heating element may be made in a springy form able to spring up and down without deforming permanently, or it may be made rigid and able to ride up and down on rods which ride on springs (see FIG. 6). In the form which is springy there is a greater radial concentration of rods or loops 18 around the points of attachment 17 (see FIG. 2), where the loops are not free to ride up and down to absorb stress, and another concentration of rods or loops 18 around the outer perimeter 19 to protect the outline cross-section. The dimensions of the molten pool of rock are important to the rate of advance of the drill, and the springlike form and the concentration of rods or loops 18 around the outer perimeter allow the pool to retain a substantially constant cross-sectional shape. The cross-sectional area decreases slightly as the element rides up, which slows the rate of advance of the drill body, as will be explained later. This action protects the element from damaging stresses caused by too rapid a rate of advance. The above features are designed to minimize accidental stresses on the heating element 15 so that the heating element may be operated at high temperatures where its structural strength may be small, but where it is otherwise stable. The present invention separates the functions of the heating element and the drill body: the heating element's function is to heat, not to apply substantial forces to move or shape the rock.

The body of the drill 12 moves and shapes the rock, and provides the means of controlling the rate of advance of the drill into the rock. The present invention has the feature that neither the heating surfaces or the drill body force molten rock to flow between congruent surfaces, moving across one another or penetrating the rock, for any substantial distances (say, one-tenth the diameter of the molten pool). Prior heat drills did not possess this feature and required considerable force to advance the drill, as a result. The lip 24 is a curved surface whose outermost perimeter conforms to the shape of the perimeter of the molten pool, lying a short distance from the solid rock. The body of the drill does not tough solid rock, the rock it touches having been melted before the drill body reaches it. The heating element operates at a nearly constant temperature, so the molten rock's average temperature is primarily determined by the rate of advance of the drill and hence the heating element through the rock. This average temperature determines the rock's viscosity, which undergoes its greatest change near the melting point of the rock. The drill body advances at a rate determined by the viscosity of the rock it penetrates. There is a rate at which the forces balance one another: if the drill body speeds up the average temperature of the molten rock it encounters will be less and hence the viscosity will be greater and the drill will slow down; conversely if the drill slows down below the rate which balances the forces, the average temperature of the molten rock it encounters will be higher and hence the viscosity will be lower and the drill will speed up. The weight of the drill may be altered by attaching weights (not shown) to it, and this will provide the means of controlling the balancing point as desired; the desired balancing point is one where the rock is hot enough to uniformly melt but cool enough to be quickly solidified around the shafts.

Although the body 12 of the drill does not touch solid rock, the flexible flanges 25 which form part of the shaping means 28, are designed to push against molten rock as the shafts are made and scrape away molten rock from portions of the underlying solid rock, and may tough the solid rock. The portion of the heating element lying below the orifice 20 raises the rock to a higher average temperature to facilitate the flow of the rock through the channel 23 and aperture 21.

The channel 23 and aperture 21 may be insulated with a layer of pyrolytic graphite which keeps the rock from cooling on the surfaces of the channel or aperture, and in fact keeps the rock near the surface at the hottest temperature within the channel. Pyrolytic graphite has an anisotropic thermal conductivity that is very high along its basal planes and very low perpendicular to the basal planes giving an ideal combination of conductivity and insulation to the channel 23 and aperture 21. The basal planes of the graphite lie parallel to the walls of the channel and thus conduct heat well along the walls and poorly through the walls. The greatest concentration of heat is immediately below the opening 20, and thus the heat conducted up the walls of the channel is at a maximum, facilitating the flow of rock through the channel.

The pipe 30 within the drill body 12 conducts a flow of drilling mud therethrough. It connects the input pipe 32 and the output pipe 34. The pipe dimensions are important to the shape of the drill body, which must insulate the pipe from the surrounding molten rock. The pipe is preferably ovoid in cross-section, with the larger diameter in the vertical direction. A corridor of molten rock must connect the shafts, but it need only be wide enough for the drill body to pass through, and may be narrow in comparison to the dimensions of the shaft. The rate of flow of the drilling mud is regulated by turbine means from the surface, and is preferably not much faster than needed to carry off the excess rock without clogging. As the fluid changes direction it imparts a force to the drill in its direction of advance. There is also an opposite force acting on the drill body due to the flow of rock internally through channel 23.

Body of these forces however, are of a smaller order than the weight of the drill.

Rock melted by the drill takes one of two alternate paths as the drill advances therethrough. A portion of it flows through orifice 20, and in turn through channel 23 and aperture 21, whereupon it is carried away by the drilling mud flowing through pipe 30. In this embodiment the molten pool is made up of two non-communicating molten regions separated by the body of the drill, the portion of the heating element attached to the orifice 20 at points 17, and the solid rock approached by the heating element below the orifice 20. Thus substantially all of the rock lying below the orifice opening is forced through the channel, and only that rock. This embodiment removes a substantially constant fraction of the rock through which the drill passes, into the flow of drilling mud.

The size and shape of the aperture 21 depends on the drilling mud selected. The greater the surface tension of the molten rock in the drilling mud, the greater may be aperture be. The aperture feeds into the drilling mud where it begins its upward flow, facilitating the rock's removal. The mud is strained at the surface to remove a certain gauge of particle; smaller ones recirculate and do not cause excessive wear and tear on the tool.

The rock that does not flow into the drilling mud flows around the surfaces 22 of the body 12, past the lip 24, to the top of the drill body 26. The rock flows from below around the shaping means 28 which make two shafts in the molten rock. Portions of the shaft walls are the solid underlying rock from which the molten rock has been scraped, perhaps leaving only a thin layer of molten rock on the solid. The density of the drilling mud is at least as great as the molten rock, and the shafts formed in the rock between member 25 and 35 are filled with drilling mud, which supports by virtue of its weight the molten rock around the shaft, and maintains the shape of the molten rock as it cools. The molten rock cools at a controlled rate due to the isolated mud in the shafts; it forms a crust on its surface which thickens as the rock cools. By the time it is reached by end areas 42 of the drill it has thickened to a desired degree capable of withstanding the flow of the cooler drilling mud on its surface without cracking. Some rock may remain molten for a much longer period before re-solidifying high above the drill body. Much of the heat supplied to the molten rock is ultimately re-captured into the drilling mud, because for most of its flow the drilling mud is cooler than the surrounding rock and thus forms a heat-sink into which the heat is collected.

Thus two shafts are formed out of the rock, each having an interior surface 41, by one drilling tool 10, while the drilling mud is in constant fluid comunication between the shafts through the tool 10. Drilling mud is isolated in the shafts 50 in a sealed off area between seals 35 and the body of the drill, where it acts as an insulating means to cool the molten rock at a rate which avoids undesirable degrees of thermal stress in the rock while cooling (hence minimizing undesirable fractures). The seals are not hermetic and they and the openings 39 allow the isolated mud to be slowly replenished as needed. Baffles 43 attached to pipe sections 32 and 34 respectively may be provided between flexible flanges 25 and seals 35 to keep the contained fluid within this area from circulating by convection; the outermost portions of these baffles 43 are closely adjacent the inner walls 41 of the shafts.

Note that pipes 32 and 34 are of fixed length and hence do not in general extend to the surface, but rather extend only far enough to provide an insulating area for cooling the shaft walls and to provide means to control the direction and rotation of the drill as it advances. They end with collapsible funnel sections 36 into which the circulating mud flows; above the funnels, the shafts in the rock conduct the flow. The shafts are selfcasing in all rock formations found at sufficient depth. One of the most important advances of the present method is the ability to circulate drilling mud without needing drilling pipe to extend down the length of the shaft, as is needed in all single shaft drilling operations except in the limited areas in which the rock can be impacted to create a shaft. Doing away with drill pipe extended from the surface does away with one of the main limitations to deeper drilling: the cost and difficulty of handling miles of pipe strung down a shaft in the earth. Doing away with drill pipe extended to the surface its also a prerequisite in order for the shafts to be able to freely spiral around one another, because a rapidly spiraling shaft would seize standard drilling pipe. In addition the drills shafts of the present invention are of essentially constant diameter, or at least with a certain lower bound to their diameter, which allows casing of one size, if any is used, to serve the entire shaft, unlike drilling methods of the past, and which allows improved fluid flow at greater depths.

The pipes 32 and 34 may be centered in the shafts by suitable guiding means such as roller and spring collars 38. Collars 38 engage the shaft walls 41 at points where the rock is solid and control the position of the pipes in the shafts at those points. Offsetting the collars from the centers of the shafts will cause the drill to rotate as it advances into the earth. The position of the pipes in the shafts represents the change in orientation of the drill advancing the distance from the shaping means 28 to the collars 38. If the collars 38 position the pipes where they would be if the tool rotated a certain angle around a central vertical axis, then that is the angle of rotation of the tool in advancing the distance from collars 38 to shaping means 28. The drill advances primarily due to its weight, and that will cause the drill to take a generally downward course; and if the drill rotates as it advances it will take an even more exactly vertical motion downward. It is possible to align the pipes in the shafts to cause the drill to take a direction moving slightly away from the vertical for some special use, but it is not the preferred general use of the present invention. In the case of the rotating drill slight variations in the general vertical motion of the drill are self-correcting.

Figure 2:
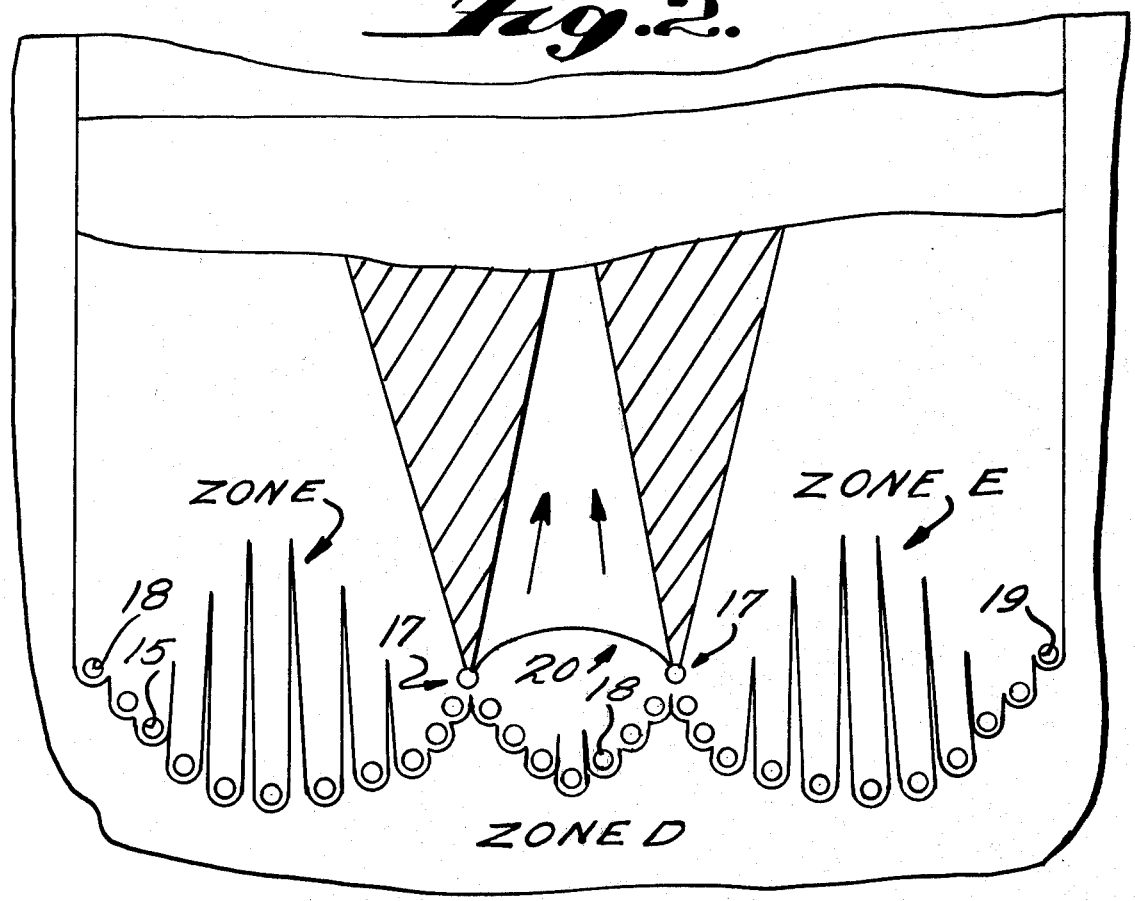
FIG. 2 is a cross-sectional view taken along lines 2—2 of FIG. 1 showing an exemplary heating coil according to the teachings of the present invention.

As shown in FIGS. 1 and 2, there are several zones of rock related to the drilling apparatus 10. Zone A is the shaped area of the upper portions of the shafts, leading to the earth's surface. Zone B is the area from the seals 35 to the top of the drill body in each shaft 50 wherein the rock is gradually solidified to form Zone A. Zone C is the largest radial area melted by the heating element 15 wherein no rock is yet solidifying. Zone D is the solid rock impinging on the heating element 15. Zone E is the solid rock penetrated by the element and in the process of melting.

Since the apparatus according to the teachings of the present invention always has a fluid drilling mud circulating therethrough during the drilling operation, it is possible to recover heat absorbed by the mud when it reaches the surface, through a heat-exchanger shown schematically at 45 in FIG. 1 or other systems converting the heat to some other useful form of energy, for any desired use. If used to generate electricity, the electricity produced could be used to supply some or all of the power needed in the drilling operation. The drilling operation could become energy self-sufficient, which would remove one of the economic limitations to deeper drilling. One form of energy taken by the heat absorbed by the mud is kinetic energy and is caused by a well-known effect known as the "thermosyphonic effect", which applied a driving force to the fluid in its direction of circulation, and may supplement or replace the pumps used to drive the fluid, and may even permit a dynamo shown schematically at 46 in FIG. 1 to be placed in the flow-path to recover useful amounts of the kinetic energy of the fluid as electric power.

Once the drill has penetrated to the desired depth, the electric current to the heating element is cut off, the drill is left in place, and the power conductor is removed. The drilling mud may also be removed if desired, particularly with the aid of the thermosyphonic effect, by gradually mixing it with another fluid, particularly water. The drill may remain at that depth permanently, or it is possible to re-start the drill at a later time. If it is desired to restart at a later time, the power cable is designed to be removable and replaceable. The drill to be restarted later must be prepared before it is turned off. The rate of advance of the drill is slowed, and a fluid heavier than the molten rock is slowly fed into the pool of molten rock where it collects and where it continuously displaces molten rock, which rises above the heavier fluid. The heavier fluid does not solidify when the drill is turned off, and it is supplied until the molten rock around the drill body is substantially replaced by the heavy fluid. The drill is locked in place and then turned off. The heavy fluid is introduced slowly for a couple of reasons: first, it must have time to displace the molten rock in the molten pool; second, introducing a volume of fluid will increase the volume of rock used to form the shafts by the same amount, so the fluid is introduced at a rate that will not significantly alter the diameter of the shafts. Eventually, by advancing slowly and introducing the heavy fluid at a suitable rate, almost all of the rock penetrated by the heating element, including Zone E, will have been displaced by the fluid; so when the drill is turned off it will not be seized and crushed by the surrounding rock as it re-solidifies. To re-start the drill later the power cable is replaced, the heating element is re-heated, and the drill is advanced slowly enough to melt the remaining solid rock, if any, in the interior channel by conduction along the channel walls ahead of the advancing drill. After the solid rock in the interior channel is melted, the drill may advance at a faster pace. The heavy fluid will be gradually used up over a period of time, perhaps by coating the shaft walls or mixing slightly with the rock; once it has been used up the drill is then free to advance as in the original drilling operation. The power cable may be hollow and may be used to introduce the heavy fluid; if the cable opens into a low region of the molten pool, it may also be used to remove a portion of the fluid during the restarting of the drill.

The energy used in the drilling operation may be produced by a high-frequency electric generator located on the surface, and is preferably transmitted by a cable suitable for high-frequency transmission. The cable resists heat, high pressure, and corrosion, and preferably balances itself in the flowing drilling mud.

The advantage of high-frequency current is that its flow is concentrated near the surface of the heating element 15 in a manner known as the "skin effect". This effect raises the resistance of the heating element and makes it possible to use higher voltages and lower amperages in transmission. This allows the heating element to be designed for strength and heating qualities rather than for its electrical resistance. It is likely that the heating element will be made of a good electrical conductor. It is also possible to use a wave guide as a power conductor instead of a cable if extremely high frequencies are used.

Figure 3:
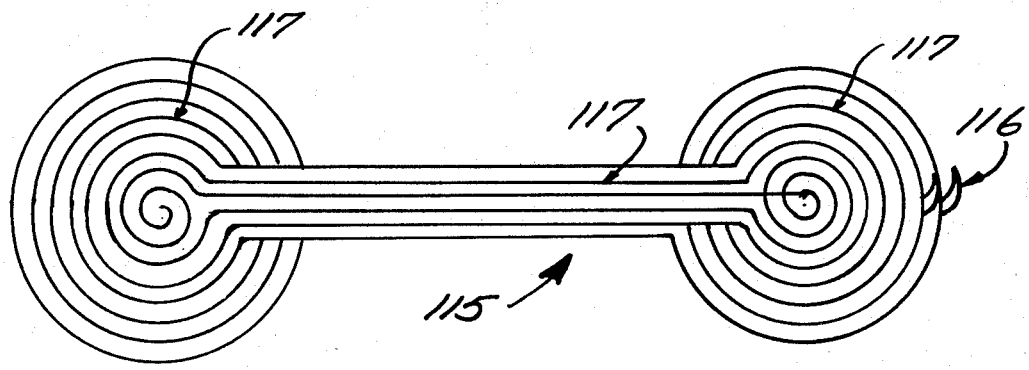
FIG. 3 is a perspective view of another heating element utilizable according to the teachings of the present invention.

Although the above process does not introduce any undesirable fractures or degrees of thermal stress in the rock, it is desirable to prepare the downflow shaft during the drilling operation for later fracturing. After drilling ceases, a suitable fracturing process extends particularly placed and oriented fractures into the surrounding rock. Means associated with the shape of the heating element 15 and the shaping means 28 may induce one or more grooves, which cut radially outward into the rock, down the length of the walls of the downflow shaft in particular locations. Means associated with the shape of the heating element 15 also concentrate the greatest thermal stresses in the rock directly ahead of the groove's cut to facilitate later fracturing operations. The cuts are V shaped. An arcuate protrusion is shown at 116 in FIG. 3 which is used to melt the V shape into the solid perimeter of the molten pool. It is preferred that the drill rotates as it advances into the earth. In this case, later fracturing will produce surfaces resembling helical surfaces which have certain advantages which will be described later. Means may also be provided to control the adjustment of the positioning means 38 to change the rate of rotation of the drill as it advances.

The grooves and the concentrated thermal stresses in the shaft wall produced in drilling are used in later hydraulic fracturing, which may be done by conventional means. The fractures start in the grooves and extend radially autward into the rock. It is also possible to use the momentum of the flowing mud to advantage in creating hydraulic pressure, by placing a means such as 80 in the downflow shaft to obstruct and choke the flow down the shaft. In the case of shafts that extend to great depths the momentum of the entire column of fluid above such choking means 80 contributes to the increase in pressure, which will thus show a greater increase at greater depths, unlike the usual method of hydraulic application of pressure which produces an equal increase in pressure at all depths.

Figure 8:
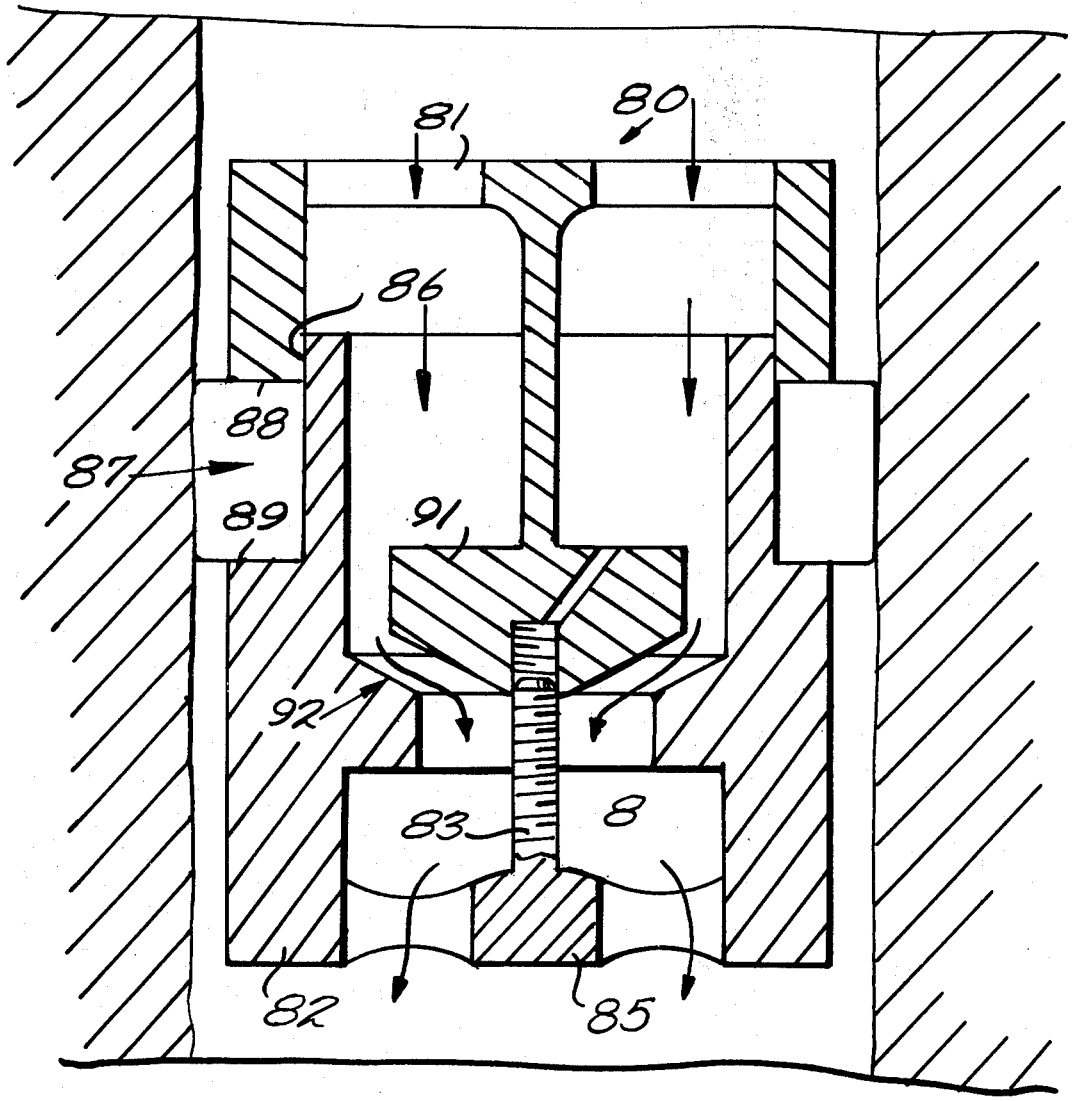
FIG. 8 is a cross-sectional diagrammatic view of exemplary apparatus for applying hydraulic pressure to create or extend fractures.

The apparatus 80 for applying hydraulic pressure to create or extend fractures is shown in FIG. 8 and consists of an upper section 81 and a lower section 82 which are moved relative to one another by the rotation of a shaft 83 turning a screw 84. The shaft 83 is turned by a motor 85. The two sections 81 and 82 form a piston-like seal at points 86 [a piston ring may be provided]. A pneumatic tube 87 is attached to the upper section 81 at points 88 and to the lower section at points 89 and encloses a fluid. As the sections are brought closer together the pneumatic tube expands outward and meets the walls of the shaft forming a seal around the outside of the whole apparatus 80. As the sections 81 and 82 are brought closer together a valve which is formed by a plunger 91 and a seat 92 [which form a tight seal when they are brought into contact with one another], is gradually closed. Hydraulic fluid flows through apertures in sections 81 and 82, taking a path as shown by the arrows in FIG. 8 through the apparatus 80. The action of the motor 85 is regulated to maintain a desired rate of deceleration of the flowing fluid and hence the desired pressure increase for fracturing due to the fluid deceleration.

The fractures may also be extended and propped by conventional means (see U.S. Pat. Nos. 3,303,883; 3,050,119; 3,018,095 and 2,368,424); this may be done before or after the drilling operation has been completed.

An important next step is to introduce partitioning material horizontally into the space within the fractures. This material sets in place and divides the volume within the fracture into separate cells, such as cell 62 (see FIG. 4). Convection currents (see arrows in FIG. 4) arise naturally in each cell because the fluid will be cooler nearer the shaft, and these convection currents facilitate the collection of heat from the other portions of the fractures. The fractures open into the shafts unless an additional casing is inserted into the shafts. If the fractures remain open into the shafts fluid in the shafts will mix with fluid in the fractures and further facilitate heat-collection; whether casing is used or not, convection currents will still arise in the fracture cells. If desired, a heat conducting casing shown in dotted line at 47 in FIG. 1 may be placed in the downflow shaft and an insulating casing shown in dotted line at 48 in FIG. 1 in the upflow shaft to increase the efficiency of the heat transfer.

Note that the fractures do not provide connecting flow-paths between the shafts, and that all of the flow between the shafts in the earth takes place through the drill. This allows the fracturing process to take place during the drilling process or to alternate with the drilling process without interfering with the means of rock removal by the drilling mud. Heat which is collected in the fluid flowing in the shafts by convection, conduction, and by mixing of fluids in the shaft with fluids in the cells, is carried by the flowing fluid to the surface for any desirable use and also adds to the thermosyphonic effect on the flow, which may also be used to provide power.

The preferred fractures are the above mentioned helical surfaces, for a number of reasons. First, the rotating shafts facilitate equal heat collection from all sides, rather than favoring one side. Second, helical fractures have properties that improve on vertical fractures in another important way. Helical surfaces ideally are the surfaces swept out by a line extending perpendicularly from an axis and rotating at a constant rate as it advances along the axis. The surface swept out is more nearly vertical near the axis and is more nearly horizontal as the distance from the axis increase. The vertical distance between areas of the resulting surface is the same at different distances from the axis, however, and for a helical surface that makes one complete revolution in 200 feet along the axis the vertical distance between areas on the surface is always 200 feet. This means that all of the points between these surfaces are within 100 feet of one surface regardless of the radius of surface. In geothermal heat collection, the slowest aspect of heat collection is conduction through the rock, and the distance of points within the rock from the heat collection means is quite important to the rate of heat collection. Non-rotating vertical fractures, on the other hand, diverge from one another in proportion to the distance from the axis. This is the essential distinction between the types of fractures that makes helical fractures preferred.

The cooling of the rock surrounding the fractures will cause shrinkage of the rock. This process will extend over a long period of time and over a wide change of temperatures, but ultimately a large volume of the rock will have significantly smaller dimensions. This will aid in increasing the volume within the fractures, and in extending them. Fracture volume developed at great depth represents the amount of work needed to raise an equal volume of rock to the surface, at the very least, and at the most it represents considerable work against elastic forces which resist deformation of the rock. But if the volume is increased as a result of the shrinkage of the surrounding rock, no special work is required, and therefore the job is done efficiently. The shrinkage may also cause other fractures to form in the fracture surfaces in other directions as well. Repeated propping should be provided to keep all fractures open and reduce subsidence of the overlying rock as geothermal energy recovery continues.

A modified form of drilling and heat recovery apparatus according to the teachings of the present invention is shown generally at 210 in FIG. 5. In this embodiment, the heating means 215 ride at a distance ahead of the opening 220 in the drill body 212, and hence does not automatically divide the flow of molten rock into interior and exterior flow paths. Instead, the molten rock flows through the channel 223 in response to the difference in pressure between the molten rock and the drilling mud. If excess rock if flowing through the channel 223 and aperture 221 into the circulating drilling mud through pipes 230 and 234, the pressure in the molten rock must be greater than the pressure in the drilling mud — in this case the means of balancing the molten rock with the drilling mud in the shafts will not work. The heating element 215 is supported by rigid or flexible rods 203 (FIG. 5) or by rigid rods 303 biased by springs 318 (FIG. 6), which allow the heating element 215 to ride up and down ahead of the drill body 212. The drill 210 does not advance primarily due to its weight as does the drill 10 in the FIG. 1 embodiment, but is advanced by mechanical means (not shown), such as a pusher, which provide a steady rate of advance which varies only gradually in response to the distance of the heating element 215 from the drill body 212. Sensing means (not shown) responsive to the distance the element 215 is from the body 212 may be provided to regulate the mechanical means and thus the rate of advance of the drill.

Figure 7:
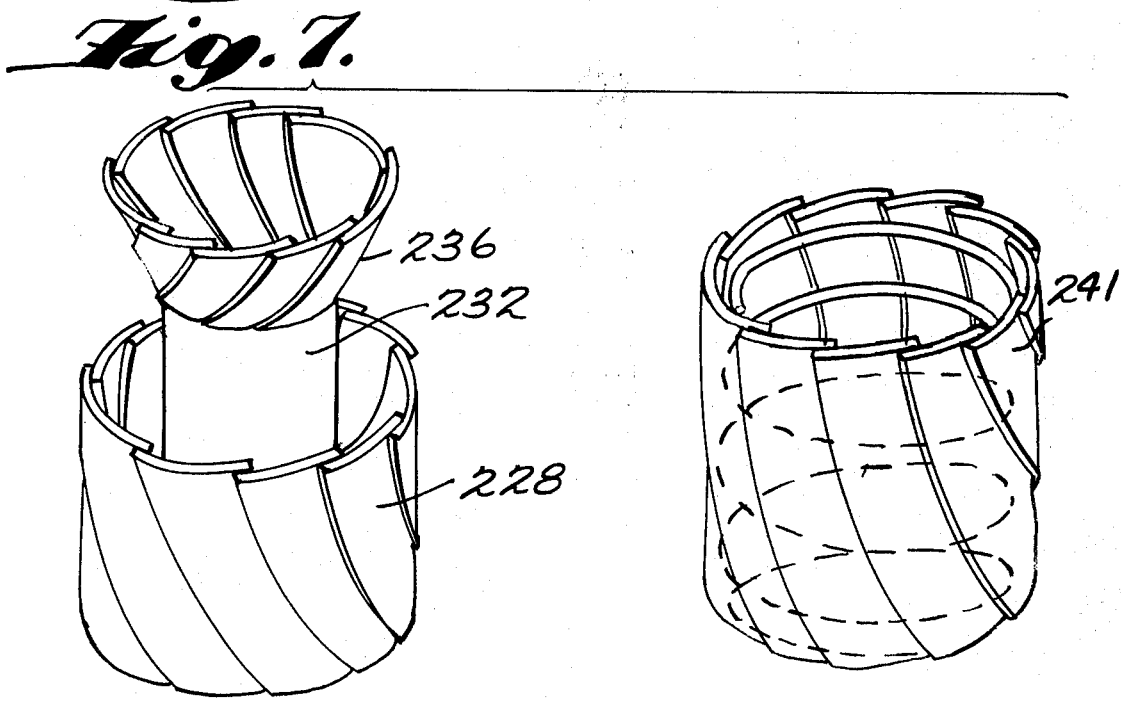
FIG. 7 is a detail view of another modification of the apparatus of FIG. 5.

The shaping means 228 (see FIGS. 5 and 7) are preferably cylinders formed of flexible overlapping sheets of non-stick material, and enclose springs such as springs 240 between the shafts 229 and 234 and the means 228 (see FIG. 5), or springs 241 incorporated within the means 228 (see FIG. 7). The springs 240 or 241 keep the cylinder 228 from collapsing under pressure, and of course exert a force tending to maintain the means 228 in its normal position. The excess pressure in the molten rock is balanced by the force of the springs, and the rock solidifies around the shaping means 228. By the time the drill 210 advances beyond an area of the shaft that has solidified, the walls are thick enough to withstand the difference in pressure between the molten rock they contain and the drilling mud in the shafts. The excess pressure in the molten rock occurs whenever the molten volume of rock exceeds the amount needed to form the shafts, and is precisely enough to remove the required amount of the excess rock.

The embodiment of the apparatus shown in FIG. 5 and 6 has both advantages and disadvantages compared to the FIG. 1 embodiment of the apparatus of the invention. The disadvantages are these: the drill must be advanced by separate mechanical means; its downward direction must also be separately controlled; the shaping means will wear out; the rate of advance is not controlled to heat the rock to a desired range of temperatures above its melting point; the cooling means must be able to form the shafts out of rock of a greater variety of temparatures; sensing means must be provided to control the rate of advance of the drill in response to the distance of the heating element; and in general, the modified form of the apparatus is more elaborate and more failure prone than the earlier form. However, the advantages may outweigh the disadvantages in some cases. The drill has the one great advantage that it works in rock of different degrees of porosity, where the amount of rock which must be removed varies according to the porosity. The embodiment of FIG. 1 removes a constant fraction of rock and hence will work well in solid rock or rock of limited porosity, but in quite porous rock it removes too much rock and the shafts are not well formed. But the embodiment of FIG. 5 will remove only the rock in excess of the amount needed to form the shafts, and will work well in rock of varying degrees of porosity. There are enough areas, where the solid basement rock is easily accessible, to meet the energy needs of the world, and so the modified form is not generally preferred, but in special cases it may be preferred to install a geothermal energy recovery well through less favorable formations — for example near a population center so that the power produced will not have to be transmitted over long distances. In that case, the FIG. 5 embodiment of the drilling apparatus may be called for.

Further modifications combining features of the FIG. 1 and FIG. 5 forms of the apparatus are possible. It is possible to attach a rigid heating element to an opening which is able to telescope up and down on springs, so that a constant fraction of the rock is removed and sensing means can adjust the weight of the drill if the heating element rides up too far; this form operates otherwise as the FIG. 1 embodiment. It is also possible to make a tool which converts from the type of FIG. 5 to the type of FIG. 1, such as shown in FIG. 6. In this embodiment, the cylinders 228 enclose the shaping means 25 of the FIG. 1 embodiment. Means may be provided to detach the means 228 when the drill reaches a certain point, whereupon the means 228 would remain in the shaft at that point, and the means 25 would be exposed. The detaching means could be a device responsive to the distance the element 215 is from the body 212 (responsive to the amount the rods 303 compress the springs 318) to open up one of the surfaces of the means 228. The conversion would take place in a naturally occurring sequence of rock strata wherein porous rock lies nearer the surface (and hence the element 215 is spaced from the body 212), and more dense rock lies further down, the element 15 contacting the more dense rock causing the rods 303 to compress the springs 318, resulting in the release of the means 228.

It will be apparent to one of ordinary skill in the art that may modifications of the method and apparatus according to the teachings of the present invention are possible. It is expected that, for example, the general shape of the element 15, the body 12, and the shaping means 28 may be altered more or less at will to suit the manufacturers' methods and the natural variety of conditions one might expect to encounter in practicing the invention. Furthermore, the present method is easily extended to three or more shafts by connecting more pipes together in the body of the drill and using the same shaft-forming methods as before for each shaft, or, alternatively, circulating fluid in only two of the shafts and providing a small amount of circulation to the other shafts cooling areas by connecting pipes from within the drill. It is also apparent that the flow of rock through the interior of the drill body into the drilling mud could be stimulated by various pumping techniques, for example by using flexible material for the channel walls and applying peristaltic forces to squeeze the rock through the channel. Sensing means could be provided where the shafts are formed to gauge the amount of rock being supplied to form the shafts, and to adjust the above-mentioned means to remove the rock more or less rapidly through the channel 23. It is also possible that some drilling with the use of the present teachings will combine or alternate with conventional drilling methods as well for best results. In particular, it is expected that some surface drilling will be done by conventional drilling means to reach the type of rock best suited to the heat-drill apparatus available. Also, a method of recovering of geothermal energy and waste heat during actual drilling could be employed when drilling a one-shaft hole as well as a two shaft one (as in utilizing the drill of U.S. Pat. No. 3,396,806). The method and apparatus are also adaptable to drilling on other geologic formations than rock, such as ice.

In designing the fracture creating and extending apparatus 80, it is possible to provide a plurality of pneumatic tubes 87 to form the seal in order to reduce the forces acting on any one of them. In addition, a plurality of the devices 80 could be stacked on top of one another and operated synchronously to slow the flow of fluid, in order to reduce the stresses acting on any one of the seals (the stresses would be evenly divided among the devices 80 if they were separated from one another by a given distance and operated synchronously).

Many other modifications are also possible; thus, while the most practical and preferred embodiments of the invention have been shown and described herein, departures may be made therefrom within the scope of the invention which is to be accorded the full scope of the claims so as to embrace any and all equivalent structures and methods.

What I claim is:
1. A method of recovering resources from subterranean rock, particularly geothermal heat energy, comprising the steps of
   a. drilling into the earth with a rockmelting drill,
   b. forming two separate and distinct shafts at the same time with the drill,
   c. circulating heat-absorbing fluid down one of said shafts to and through said drill and up another of said shafts, and
   d. recovering heat absorbed by said fluid from said fluid.
2. A method as recited in claim 1 comprising the further step of removing a portion of the melted rock during the drilling process by extruding it into said circulating fluid.

3. A method as recited in claim 2 comprising the further step of removing a particularly located, substantially constant fraction of the rock penetrated by the drill.

4. A method as recited in claim 2 comprising the further step of removing substantially the amount of rock in excess of the amount needed to form the shafts.

5. A method as recited in claim 1 comprising the further step of causing the drill to rotate slowly as it advances into the earth, forming spiral shafts having a particular pitch of rotation.

6. A method as recited in claim 1 wherein the weight of the drill controls the rate advance of the tool during drilling.

7. A method as recited in claim 1 wherein the shafts formed by said drill are partially or wholly formed in melted rock solidifying in situ.

8. A method as recited in claim 7 comprising the further step of controlling the rate of cooling of said shafts formed by said melted rock so that undesirable fractures are not introduced into the rock forming said shafts by thermal stresses.

9. A method as recited in claim 8 comprising the further steps of first shaping said shafts from said molten rock and then maintaining said shafts in said shape during a cooling period by supporting the shafts with a fluid of equal or slightly greater density to the molten rock.

10. A method as recited in claim 8 wherein the shafts are first shaped out of molten material by forming around the shaping means under greater pressure than found in the fluid in the shafts at the depth, and solidify while being supported by said shaping means.

11. A method as recited in claim 10 wherein the rate of cooling of the molten rock is controlled so that a limited amount of thermal stress occurs while the rock solidifies and undesirable fractures are not introduced.

12. A method as recited in claim 1 comprising the further step of controlling the vertical deviation of the advance of the tool from the downward direction.

13. A method as recited in claim 1 wherein said circulating and recovering steps are practiced both during the drilling operation and after said drilling operation has ceased.

14. A method as recited in claim 13 comprising the further step of recovering kinetic energy from the flowing fluid which results from the thermosyphonic effect by placing dynamo means in the flow-path.

15. A method as recited in claim 14 wherein the dynamo means is placed in the downflow shaft and recovers kinetic energy from the falling fluid, which returns to the surface by means of the thermosyphonic effect, remaining liquid throughout.

16. A method as recited in claim 1 comprising the further step of stopping said drilling and replacing said circulating fluid with another fluid.

17. A method as recited in claim 1 comprising the further step of forming particularly shaped and positioned grooves down the length of said downshaft during the drilling operation.

18. A method as recited in claim 17 comprising the further step of concentrating thermal stresses at the apexes of said grooves, which are cut in a wedge shape into the walls, to aid later fracturing by hydraulic means.

19. A method as recited in claim 18 comprising the further step of hydraulically initiating fractures at said apexes and extending them into the surrounding rock.

20. A method as recited in claim 19 comprising the further step of propping said fractures.

21. A method as recited in claim 20 comprising the further step of repeating the propping operation at selected intervals of time to take advantage of the normal shrinkage of the cooling rock over long periods of time and to avoid closing the fractures by the subsidence of the overlying rock.

22. A method as recited in claim 21 comprising the further step of forcing partitioning material horizontally into said propped fractures to form heat-collecting convection cells within said fractures.

23. A method as recited in claim 22 comprising the further steps of placing a heat conducting casing in the downflow shaft and an insulating casing in the upflow shaft.

24. A method as recited in claim 17 comprising the further step of ensuring that any initial fractures that may arise at the apexes of the grooves due to concentrated thermal stresses are the only fractures that arise as a result of thermal stress.

25. A method as recited in claim 24 wherein it is ensured that no undesirable fractures are introduced as the rock cools and solidifies by introducing some drilling fluid into the shafts outside of the flow of drilling fluid, and keeping said fluid from rapid motion or rapid change of temperature.

26. A method as recited in claim 1, wherein said rock-melting drill has a heating element, comprising the further step of controlling the rate heat is supplied to the heating element of said drill so that it is well above the melting point of the rock, and melting only a portion of the rock by direct penetration therethrough with said heating element, the rest of the rock that is melted being melted by heat-conduction from the rock directly melted by the drill heating element.

27. A method as recited in claim 19 wherein the fracture surfaces produced resemble helical surfaces, and remain on the average within a limited distance from one another or from branches of the same fracture independent of the radius of fracture.

28. Apparatus for drilling into rock and recovering resources, particularly heat energy, therefrom comprising
 a. a heating element capable of being heated to and remaining at temperatures about 1200° C without melting or deteriorating,
 b. means for supplying electrical power for said heating element,
 c. a drill body having bottom, top and side portions, said drill body operatively connected to said heating element and having means associated therewith for causing rock melted by said heating element to form at least two separate and distinct shafts at the same time, and causing some rock to be removed,
 d. means for circulating a heat-absorbing fluid down one of said shafts, through said drill body, and up another of said shafts,
 e. means for recovering heat absorbed by said fluid from said fluid.

29. Apparatus as recited in claim 28 wherein said heating element is grid or coil shaped, and advances ahead of the body of the drill.

30. Apparatus as recited in claim 28 wherein said heating element is made of material selected from the group consisting of tungsten, pyrolytic graphite, molybdenum, tantalum, and rehenium.

31. Apparatus as recited in claim 28 wherein said heating element directly melts and displaces only a small fraction of the total rock ultimately melted, or ultimately displaced by the advancing drill body.

32. Apparatus as recited in claim 28 further comprising means of mounting said heating element for a degree of up and down movement relative to said drill body along the line of the advance of the drill.

33. Apparatus as recited in claim 32 wherein said means comprises spring-biased rods.

34. Apparatus as recited in claim 32 wherein said element is formed in the shape of a coil and is springy, and wherein said means for mounting said element includes means for fastening said element to said drill body only at selected portions thereof so that said element maintains its springy character.

35. Apparatus as recited in claim 28 wherein said means for forming said shafts includes a shaping surface set on the top of said drill body, said shaping surface having during operation of the tool substantially the same cross-sectional outer perimeter as said shafts.

36. Apparatus as recited in claim 35 wherein said shaping surface on top of said drill body includes flexible scrapers which move molten rock away from portions of the solid rock, particularly from a groove or grooves in the rock.

37. Apparatus as recited in claim 28 further comprising an orifice opening into the bottom of said drill for allowing removal of some melted rock.

38. Apparatus as recited in claim 37 wherein said orifice leads through a channel to an aperture in a pipe section within said drill body, said pipe section forming part of said means for circulating said heat-absorbing fluid through said drill body, whereby rock flowing through said aperture is carried to the surface by said circulating fluid.

39. Apparatus as recited in claim 38 wherein said heating element is constructed so that more heat is on the average applied to the melted rock that passes through said orifice than the rest of said rock being melted.

40. Apparatus as recited in claim 39 wherein said heating element is in the shape of a coil or grid.

41. Apparatus as recited in claim 28 wherein said means for circulating said heat-absorbing fluid includes a pipe section extending from the top of said drill body for each of said shafts, said pipe section of fixed length, and a curved pipe section in said drill body connecting said pipe sections in fluid communicating relationship.

42. Apparatus as recited in claim 41 wherein the curved pipe section within said drill body is ovoid in cross-section with its largest axis in the vertical direction.

43. Apparatus as recited in claim 41 further comprising means for cooling said shafts at a slow enough rate that no undesirable fractures are formed therein.

44. Apparatus as recited in claim 43 wherein said cooling means comprises seal members surrounding each of said pipe sections extending from the top of said drill body, and valve means for introducing a portion of said heat-absorbing fluid from said pipe sections into the area between the said pipe sections and their corresponding seals and the top of said drill body and the corresponding shaft walls.

45. Apparatus as recited in claim 44 wherein said cooling means includes partitions or baffles attached to the pipe section between the top of the drill body and the seals, and extending close to the walls of the shaft to keep the contained fluid from circulating by convection.

46. Apparatus as recited in claim 43 wherein said cooling means comprises a slightly tapered, nearly cylindrical, surface made of overlapping sheets onto which the molten rock is forced under pressure and on which it cools and solidifies, made of a non-stick flexible material held against the rock by springs contained in the cylinder.

47. Apparatus as recited in claim 41 further comprising means for positioning upper portions of said pipe sections relative to said shafts to control the orientation of the tool in said shafts.

48. Apparatus as recited in claim 47 further comprising means for providing for and controlling the amount of rotation of the drill as it advances into rock, said means including means for adjusting the orientation of said positioning means relative to said shafts and pipe sections.

49. Apparatus as recited in claim 28 wherein the rock melted between the shafts formed by the drill lies within a narrow corridor less wide than the diameter of the shafts.

50. Apparatus as recited in claim 28 further comprising turbine means acted on by the flow of said circulating fluid, which is impelled by thermosyphonic forces.

51. Apparatus as recited in claim 50 wherein the turbine is placed in the down-flow shaft and driven by the fluid falling under the force of gravity, which is then returned to the surface by the thermosyphonic effect, having remained liquid throughout.

52. Apparatus as recited in claim 28 wherein adjusting the weight of said drill body controls the rate of descent of said drill.

* * * * *